United States Patent [19]

Lehman

[11] Patent Number: 5,518,667

[45] Date of Patent: May 21, 1996

[54] LIQUID DISTRIBUTOR FOR HEAT AND MASS EXCHANGE DEVICE, DISTILLATION COLUMN COMPRISING SUCH A DISTRIBUTOR AND USE OF SUCH A COLUMN FOR DISTILLATION OF AIR

[75] Inventor: Jean-Yves Lehman, Maisons-Alfort, France

[73] Assignee: L'Air Liquide, Societe Anonyme Pour L'Etude et L'Exploitation Des Procedes Georges Claude, Paris, France

[21] Appl. No.: 323,771

[22] Filed: Oct. 17, 1994

[30] Foreign Application Priority Data

Oct. 29, 1993 [FR] France ......................... 93 12948

[51] Int. Cl.⁶ ............................................. B01F 3/04
[52] U.S. Cl. ........................................ 261/97; 202/158
[58] Field of Search ................. 261/97, 98, 110, 261/113; 202/158

[56] References Cited

U.S. PATENT DOCUMENTS

| | | |
|---|---|---|
| 3,431,084 | 3/1969 | Forbes . |
| 4,427,605 | 1/1984 | Meier et al. ........................ 261/97 |
| 4,476,069 | 10/1984 | Harper et al. ........................ 261/97 |
| 4,808,350 | 2/1989 | Robbins et al. ........................ 261/97 |
| 4,839,108 | 6/1989 | Silvey ........................ 261/97 |

FOREIGN PATENT DOCUMENTS

| | | |
|---|---|---|
| 0153974 | 9/1985 | European Pat. Off. . |
| 0563900 | 10/1993 | European Pat. Off. . |
| WO92/13620 | 8/1992 | WIPO . |

*Primary Examiner*—Tim R. Miles
*Attorney, Agent, or Firm*—William S. Frommer

[57] ABSTRACT

The distributor includes a pattern of irrigation points with advantageously substantially constant surface pitch over most of the irrigation area, the pattern being, typically, regular in a main region of the distributor and irregular, with associated surface regions which are also irregular in a junction region, the irrigation points delivering predetermined flow rates defined by calibrated orifices which have cross-sections chosen from a predetermined group of n cross-sections, n not being greater than four and advantageously not greater than two. This distributor is particularly applicable to packed air distillation columns.

11 Claims, 2 Drawing Sheets

LIQUID DISTRIBUTOR FOR HEAT AND MASS EXCHANGE DEVICE, DISTILLATION COLUMN COMPRISING SUCH A DISTRIBUTOR AND USE OF SUCH A COLUMN FOR DISTILLATION OF AIR

The present invention relates to a liquid distributor for a heat and mass exchange device, the device having an upper interface constituting an irrigation area, the distributor comprising gas passages and a plurality of liquid passages.

Distributors for heat and mass exchange devices of this type are described, for example, in documents FR-A-2,121,185 and EP-A-0,491,591. In practice, in particular in packed air distillation columns, use is made of two distributors, as described in FIGS. 1 to 4 hereinbelow. A first type, described in FIGS. 1 and 2 includes, arranged transversely in the shell ring 1 of the column, a plane structure 2, advantageously constituting the coplanar bottoms of attached parallel chutes extending above the mass and heat exchange device 3, advantageously consisting of packing, in bulk or structured—typically with so-called corrugated/crossed structure, as described in document EP-A-0,367,817 in the name of the Applicant Company. The structure 2, with the chutes which communicate with one another, especially at the periphery of the structure 2, forms a reserve for accumulation of a quantity of liquid L and includes numerous orifices 4 for distributing the liquid under gravity onto the irrigation area of the device 3. The structure 2 includes a series of circular or oblong shafts 5, as represented in FIG. 1, allowing passage of gas upwards through the distributor. In the other type of distributor, represented in FIGS. 3 and 4, the liquid distributor comprises a series of chutes or of parallel tubes 20 which are spaced apart from one another, centrally supplied with liquid and optionally connected by one or more transverse chutes 21, the various chutes forming the liquid reserve L and forming between them spaces 50 for passage of the gas. The chutes 20 form, at their lower end, a surface 2' which is parallel to the upper surface of the device 3 and in which the discharge orifices 4 are formed. In one or other of the two types, the orifices 4 are formed, as represented in FIGS. 1 and 3, in regular patterns (orifices aligned in parallel rows) apart from the detailed arrangement of the discharge regions in the vicinity of the shell ring 1. For reasons of ease of manufacture, the orifices 4 preferably have identical cross-sections. Nevertheless, as represented in FIG. 5, in conjunction with the type of distributor according to FIGS. 1 and 2, if the orifices 4 are distributed in a regular pattern with a regular grid of irrigation surfaces, represented by the dotted rectangles 6 in FIG. 5, it is observed that, in the vicinity of the peripheral contour of the distributor, typically defined by the shell ring 1 of a column, some regions of the grid of orifices 4, such as those represented at 7, have an "amputated" surface, which indicates that the grid cells in question have a local flow rate comparatively greater than that of the other orifices in the regular grid, whereas other regions, such as those represented at 8, have no discharge orifices and therefore constitute "dry" regions, these two conditions contributing to local degradation of the ratio of the gas flow rate to the liquid flow rate in the column. One solution for overcoming these drawbacks must consist in increasing the number of orifices so as to reduce the pitch of the regular pattern of points, accordingly reducing the diameter of the orifices in order to retain the liquid buffer L in the distributor. This solution is, however, unsuitable insofar as it considerably increases the manufacturing costs and limits the precision of the liquid discharge flow rate because of the difficulties of producing precise orifices with small cross-section, which, on the contrary, militates in favour of the production of large-diameter orifices, since the problems of liquid flow rate are made increasingly more acute by the enhanced risks of blocking or clogging of the orifices with small cross-section. Another approach must consist in producing, in the peripheral region, orifices with different adapted diameters: smaller in regions such as 7 or increased in the vicinity of regions such as 8. This solution is also ill-suited insofar as it would require the production of a large number, generally greater than 10, of different orifice cross-sections, which would considerably increase the manufacturing costs because of the requirement of providing multiple or complex drilling tools, moreover to the detriment of the precision of the liquid flow rate, and by exposing the orifices with smaller cross-sections to the risk of blockage.

The object of the present invention is therefore to provide a precision distributor which makes it possible, in a simple, flexible, reliable and inexpensive manner, to increase the regularity of the liquid flow rate discharged, while reducing the risks of blockage.

For this purpose, according to one characteristic of the invention, characterized in that the liquid passages are defined by calibrated orifices distributed in a pattern of irrigation points which is at least partially irregular, the orifices having a cross-section chosen from a group of n predetermined different cross-sections, n not being greater than 4, and advantageously not being greater than 2, each orifice being associated with an individual surface having an area corresponding to the cross-section of the associated orifice.

According to one particular characteristic, the orifices have a substantially constant cross-section, corresponding to a nominal passage cross-section of a circular orifice with diameter typically lying between 2 and 10 mm, advantageously between 3 and 5 mm, and are distributed in a pattern of irrigation points with substantially constant surface pitch over the irrigation area.

This arrangement according to the invention makes it possible efficiently to deal with the problems of the edges of the distributor, with a reduced range of orifice cross-sections, especially with orifices with single passage cross-section, while simultaneously making it possible to optimize the number of irrigation points per unit irrigation surface area, while retaining a relatively large nominal orifice passage cross-section and therefore decreasing their sensitivity to blockage.

According to other characteristics of the invention, the distributor includes:

a plane structure in which the orifices are formed according to the said pattern;

a series of interconnecting chutes in which the orifices are formed according to the said pattern.

In the context of the present invention, the term "chute" means profiles with angled cross-section and flat bottom, as represented, or with rounded cross-section, for example tubes, the lower parts of which are substantially tangential to one and the same horizontal plane.

A further subject of the present invention is a distillation column, in particular an air dispersion column, equipped with such a distributor combined with a heat and mass exchange device of the packed type, advantageously with structured packing.

Other characteristics and advantages of the present invention will emerge from the following description of embodiments which are given by way of illustration but without any limitation, in conjunction with the attached drawings, in which.

Figure 1:
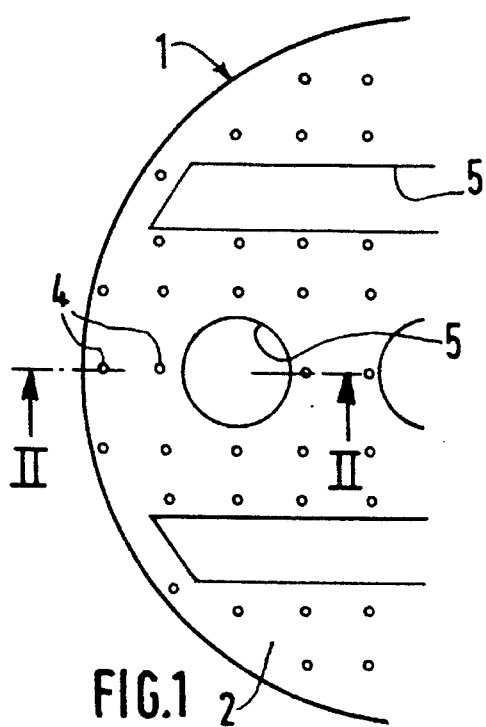
FIGS. 1 and 3 are plan views of two main embodiments of liquid distributors for distillation columns.
Figure 2:
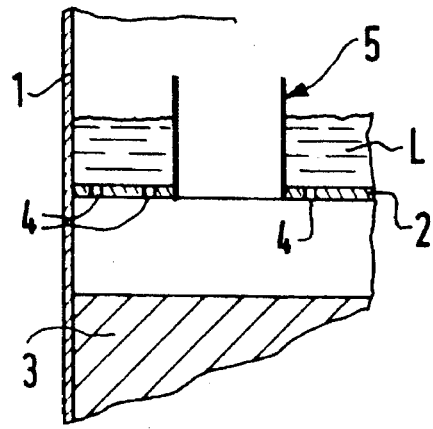
FIGS. 2 and 4 are sectional views on the section planes II—II and IV–IV in FIGS. 1 and 3, respectively.
Figure 3:
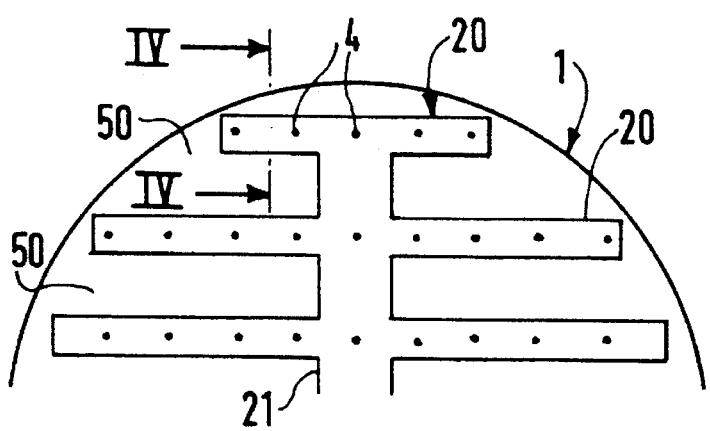
Figure 4:
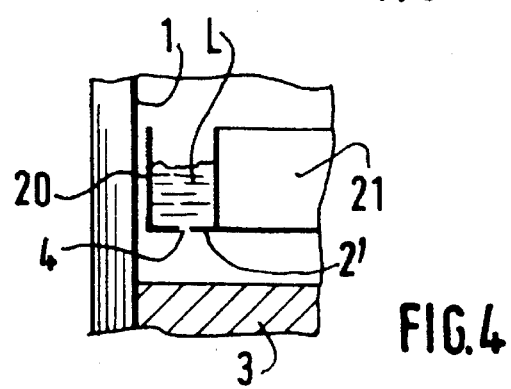
Figure 5:
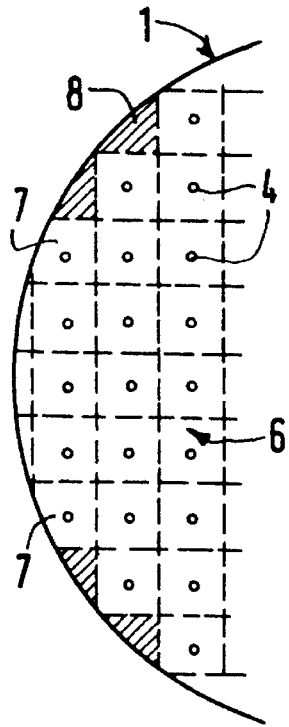
FIG. 5 is a diagrammatic plan view of a conventional distributor, showing the distribution of the liquid passages.
Figure 6:
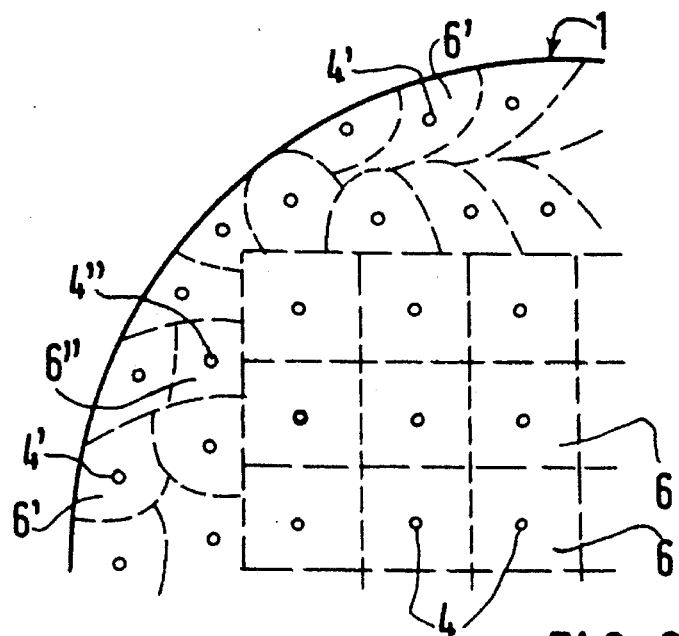
FIG. 6 is a similar view to FIG. 5, illustrating one distribution of the liquid passages according to one embodiment of the invention, applied to a distributor with plane structure.

As shown in the embodiment of FIG. 6, in a distributor of type with plane structure according to the invention, there is advantageously, in the central part of the structure 2, a distribution of orifices 4 in a regular pattern, here orthogonal, each being at the centre of gravity of an individual regular surface region 6, here quadrilateral. According to one aspect of the invention, the central pattern of orifices 4 with a grid of regular surface regions 6 is supplemented, at its periphery, by a disordered pattern of orifices 4' arranged at the centre of gravity of surface regions 6' having, in the embodiment represented, mostly substantially the same area as the regular regions 6, but with irregular shapes, the orifices 4' here mostly having the same cross-section as the orifices 4 of the regular pattern. On the left of FIG. 6, however, two orifices 4" have been represented with the same cross-section which is less than that of the orifices 4 and 4' with which the surface regions 6" are associated, which regions have a reduced surface area proportional to the reduced cross-sectional area of the orifices 4". For a given total irrigation area, depending on the diameter of the column, and for a predetermined orifice 4, 4' nominal diameter which typically lies between 3 and 5 mm, it is possible to define a total number of identical orifices 4, 4' and therefore a corresponding individual surface area, the shapes of the individual peripheral surfaces 6' and 6" being determined by step-by-step calculation of surface areas over the residual irrigation area around the central area having regular surfaces 6. According to the invention, other orifices (not shown) having cross-sections greater than those of the orifices 4, 4' or less than those of the orifices 4" may be provided locally, at the centre of gravity of individual surfaces with areas corresponding to the cross-sections of these orifices. The number of different orifice cross-sections is not greater than 4, and in practice, is not greater than 3. The ratio of the largest orifice cross-section to the smallest orifice cross-section (in practice corresponding to a diameter of 1 mm) does not exceed 100, and typically does not exceed 50.

Figure 7:
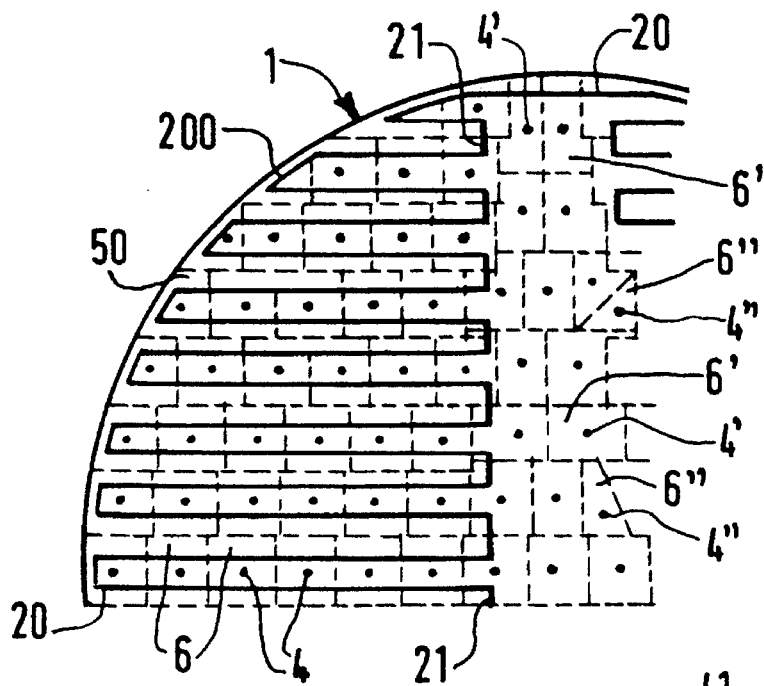
FIG. 7 is a plan view similar to FIG. 6, showing the distribution of the liquid passages in a distributor with chutes according to one embodiment of the invention.

As shown by FIG. 7, in one embodiment having separate chutes 20, the latter are, according to one aspect of the invention, dimensioned and shaped so that their free ends 200 substantially match the profile of the column shell ring 1, in immediate proximity thereto, and the individual surfaces 6 are determined as a function of the distribution of the orifices 4 having the same nominal cross-section, which are formed in the bottom of the chutes 20, this time starting from the ends 200, that is to say the side edges of the distributor. As shown by FIG. 7, the distribution of the orifices 4 is regular (here in circular arcs and in alignment) over the side parts of the distributor, the corresponding surface regions being mostly regular, and this distribution reproduces the problem of adjusting the individual surface areas in the region of the distribution or equilibration chute 21 where, as in the case of the peripheral region in FIG. 6, the individual surfaces 6' of the orifices 4' with irregular pitch have variable contours which are determined by step-by-step calculation of surface areas and conserve, in the case of orifices 4 and 4' having the same nominal cross-section, the same surface area as the regular surfaces 6. Here again, orifices 4" having reduced cross-section with respect to that of the orifices 4, 4', and associated with surface regions 6" which also have reduced surface area, have been represented.

Figure 8:
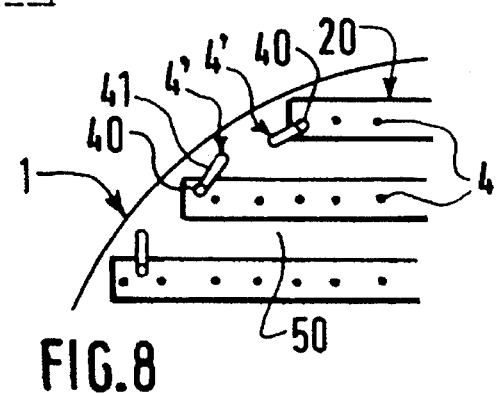
FIG. 8 is a plan view of an alternative embodiment of a distributor with chutes according to the invention.

Depending on the geometry of the distributor, there may be cause to offset the irrigation points with respect to the chutes 20 in which the calibrated orifices 4 are made. In the embodiment of FIG. 8, discharge in the vicinity of the shell ring 1 is thus ensured, at least in part, by the outlets 41, for example of the overspill type, which extend below the chutes 20 and outside the latter, in order to make irrigation points 4' outside the chutes, but ones which nevertheless ensure a discharge flow rate advantageously identical to that of the orifices 4 of the chutes, each being supplied by an orifice 40 made in one chute and having the same cross-section as the orifices 4, the distribution of the irrigation points 4' being determined in the same manner as for those in the case of FIGS. 6 and 7.

Although the invention has been described with reference to particular embodiments, it is in no way limited thereby but, on the contrary, is susceptible of amendments and variants which may occur to the person skilled in the art.

I claim:

1. A liquid distributor for a heat and mass exchange device having an upper interface forming an irrigation area, the liquid distributor comprising gas passages and a plurality of liquid passages, said liquid passages being defined by calibrated orifices distributed in a pattern of irrigation points, which pattern is at least partially irregular, the orifices having a cross-section chosen from a group of n predetermined different cross-sections, n being an integer not greater than 4, each orifice being associated with an individual surface having an area corresponding to the cross-section of its associated orifice.

2. The distributor according to claim 1, wherein the ratio between the maximum cross-section and the minimum cross-section in the group of n cross-sections is less than 100.

3. The distributor according to claim 1 wherein n is not greater than 2.

4. The distributor according to claim 1, further including a plane structure in which the orifices are formed in said pattern.

5. The distributor according to claim 1, further including a regular pattern of irrigation points disposed in a central part of said pattern.

6. The distributor according to claim 1, further including a series of parallel, interconnecting chutes in which the orifices are formed in said pattern.

7. The distributor according to claim 6 further including at least one discharge passage extending between an orifice formed in one of said chutes and an irrigation point offset from said one chute.

8. The distributor according to claim 6, wherein at least some of the chutes have one end extending into the immediate vicinity of a peripheral shell ring which encloses the distributor and the exchange device.

9. The distributor according to claim 8, further including a regular pattern of irrigation points located in lateral regions close to said one end of the chutes.

10. A distillation column associated with a heat and mass exchange device of the packed type, said distillation column having a liquid distributor including an upper interface comprised of an irrigation area containing gas passages and a plurality of liquid passages, said liquid passages being defined by calibrated orifices distributed in a pattern of irrigation points, which pattern is at least partially irregular, the orifices having a cross-section chosen from a group of n predetermined different cross-sections, n being an integer greater than 1 and not greater than 4, each orifice being associated with an individual surface having an area corresponding to the cross-section of its associated orifice.

11. The column according to claim 10, wherein the heat and mass exchange device is of the structured packing type.

* * * * *

UNITED STATES PATENT AND TRADEMARK OFFICE
CERTIFICATE OF CORRECTION

PATENT NO. : 5,518,667
DATED : May 21, 1996
INVENTOR(S) : Lehman

It is certified that error appears in the above-indentified patent and that said Letters Patent is hereby corrected as shown below:

Claim 1, line 8 (column 4, line 37): Please insert the words --greater than 1 and-- after the word "integer" and before the word "not".

Signed and Sealed this

Tenth Day of September, 1996

Attest:

BRUCE LEHMAN

*Attesting Officer*     *Commissioner of Patents and Trademarks*